May 6, 1924.

J. SCHUMACHER

CERAMIC PRODUCT

Filed Jan. 13, 1923

1,492,753

INVENTOR.
John Schumacher
BY Nestall and Wallace
ATTORNEYS.

Patented May 6, 1924.

1,492,753

UNITED STATES PATENT OFFICE.

JOHN SCHUMACHER, OF LOS ANGELES, CALIFORNIA.

CERAMIC PRODUCT.

Application filed January 13, 1923. Serial No. 612,432.

*To all whom it may concern:*

Be it known that I, JOHN SCHUMACHER, a citizen of the United States, and resident of Los Angeles, in the county of Los Angeles and State of California, have invented new and useful Improvements in Ceramic Products, of which the following is a specification.

This invention relates to a ceramic product and pertains especially to the production of a stone-like article by moulding and firing or baking.

It is desirable to produce ceramic articles having certain contours, configurations, and ornamentations, which can best be done by forming the plastic substance in a mould. In most instances, it is desirable to multiply the articles. Thus, a number of tiles of certain shapes, or having figured faces indented or raised may be made by means of molds. The primary object of this invention is to provide a ceramic article and the process of manufacturing it, which is simple, expeditious and economical, and whereby a strong, durable article is obtained. The present invention contemplates the firing or baking of plastic materials in a mould, and it is another object of this invention to provide a process whereby only a low heat will be required for fusing the ingredients of the plastic substance, so that the mould may have a long and efficient life, withstanding the heat required for baking.

Figure 2:
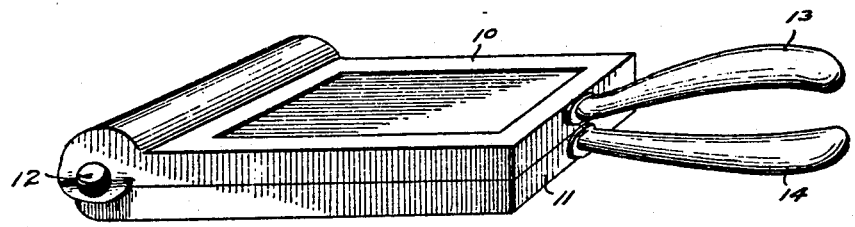
Figure 3:
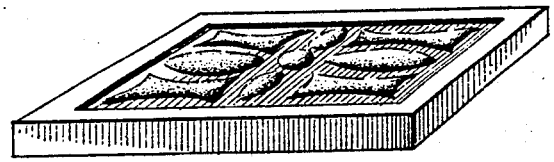
Figure 4:
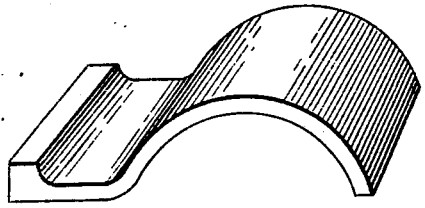

Articles made in accordance with the present invention and instrumentalities for carrying out the invention are illustrated in the accompanying drawing, but the invention is not in any way limited to the precise instrumentalities or articles shown herein. In the drawings, Fig. 1 indicates diagrammatically a furnace in which the article, in this instance tiles, are baked; Fig. 2 shows a mould for the plastic material; Fig. 3 shows a tile, which may be made with the mould shown in Fig. 2; and Fig. 4 shows a tile which may be made by following out the steps of the process described herein.

Referring more particularly to the drawing and especially Fig. 2, a mould of the two flask type is shown. Flask 10 is hinged to flask 11 by means of a pivot pin 12. For convenience in opening and closing the mould handles 13 and 14 secured to the flask are shown. These flasks are preferably made of cast iron or similar material.

A plastic mass is made by mixing ground silica, water glass, and a fibrous material which will withstand heat, such as asbestos. The ingredients are intimately mixed to form a wet plastic mass. The moulds are opened and the plastic mass placed therein. The flasks are then brought together in the position shown in Fig. 2. In this condition, the plastic material is ready for baking.

Figure 1:
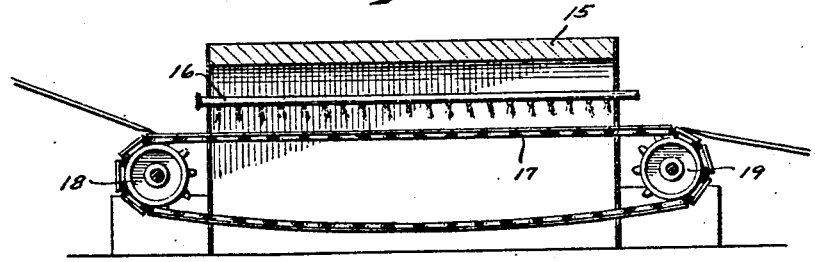

Referring particularly to Fig. 1, the walls of a tunnel-like furnace are indicated by 15. This furnace may be heated by any suitable means and for illustrative purposes only, a set of burners for gaseous or fluid fuel is shown and indicated by 16. Passing through the furnace is a grate of the endless travelling type indicated by 17. The grate is shown as passing over sprocket wheels 18 and 19, one set of which is driven.

The moulds containing the plastic substance are placed upon the grate and carried through the furnace. The heat may be regulated to gradually heat the moulds as they pass into the furnace and finally to reach a temperature as high as 400° Fahrenheit. At this temperature, the ingredients will fuse. As the moulds pass from the furnace, they may be gradually cooled by any suitable means such as transferring them to a conveyor disposed in the atmosphere. Various refinements of handling the moulds and material may be resorted to without departing from the invention.

In Fig. 3, a tile is shown having raised end indented portions. To make this in a mould of a character shown in Fig. 2, the inverted figure would be formed in the face of one of the flasks. The tile shown in Fig. 4 is suitable for roofing. It is obvious that a mould of the general character shown in Fig. 2 may be provided to form this type of tile.

What I claim is:

1. The process of making a ceramic product comprising mixing silica and water glass to form a plastic substance, placing the plastic substance in a mould, and baking said substance in the mould to the fusing point of said substance.

2. The process of making a ceramic product comprising mixing silica, water glass, and a non-fusible fibrous substance, placing the plastic substance in a mould, and baking the substance in the mould to the fusing point of the silica and water glass.

3. The process in making a ceramic product comprising mixing silica, water glass, and asbestos to form a plastic substance, placing the plastic substance in a mould, and baking said plastic substance in the mould to the fusing point of the silica and water glass.

In witness that I claim the foregoing I have hereunto subscribed my name this 5th day of January, 1923.

JOHN SCHUMACHER.